(12) United States Patent
Ichikawa et al.

(10) Patent No.: US 12,187,367 B2
(45) Date of Patent: Jan. 7, 2025

(54) TRAILER

(71) Applicant: TOYOTA JIDOSHA KABUSHIKI KAISHA, Toyota (JP)

(72) Inventors: Akira Ichikawa, Nissin (JP); Yusuke Kamijo, Toyota (JP); Atsuo Takeuchi, Tokyo (JP); Makito Muramatsu, Toyota (JP); Kayo Kimura, Musashino (JP); Hiroshi Ogihara, Chofu (JP); Nana Taie, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/208,488

(22) Filed: Jun. 12, 2023

(65) Prior Publication Data

US 2024/0067285 A1    Feb. 29, 2024

(30) Foreign Application Priority Data

Aug. 26, 2022 (JP) .................. 2022-135349

(51) Int. Cl.
*B62D 63/06* (2006.01)
*B60R 16/04* (2006.01)
(Continued)

(52) U.S. Cl.
CPC ............ *B62D 63/062* (2013.01); *B60R 16/04* (2013.01); *H01M 50/204* (2021.01); *H01M 50/249* (2021.01); *H01M 2220/20* (2013.01)

(58) Field of Classification Search
CPC .... B60K 2001/0416; B60K 2001/0472; B60K 2001/0438; B60K 1/04; B62D 221/155;
(Continued)

(56) References Cited

U.S. PATENT DOCUMENTS 6,390,215 B1 *   5/2002   Kodama ................. B60L 50/62
                                                                180/2.1
7,533,748 B2 *   5/2009   Miyajima ............. H01M 8/247
                                                                903/952

(Continued)

FOREIGN PATENT DOCUMENTS

DE   102016113759 A1 *  4/2017
JP   2012-126250 A      7/2012
(Continued)

OTHER PUBLICATIONS

English Translation JP-2020037337-A (Year: 2020).*
English translation and Original document for Yoon (KR 20200011712) (Year: 2020).*

*Primary Examiner* — Paul N Dickson
*Assistant Examiner* — Caitlin Anne Miller
(74) *Attorney, Agent, or Firm* — Dinsmore & Shohl LLP (57) ABSTRACT

A battery frame is fixed to a chassis and a battery pack is assembled to the battery frame. The battery frame includes a pair of crossbars and a pair of side bars. The crossbars extend in the vehicle width direction while being spaced apart in the vehicle front-rear direction, and have both ends in the vehicle width direction fixed to the side members. The side bars extend in the vehicle front-rear direction while being spaced apart in the vehicle width direction, and have front ends and rear ends detachably fixed to the crossbars.

2 Claims, 6 Drawing Sheets

(51) Int. Cl.
*H01M 50/204* (2021.01)
*H01M 50/249* (2021.01)

(58) Field of Classification Search
CPC .......... H01M 50/249; H01M 2220/20; H01M 50/244
USPC .......................................... 280/789; 701/122
See application file for complete search history.

(56) References Cited

U.S. PATENT DOCUMENTS

| | | | |
|---|---|---|---|
| 8,989,941 B2* | 3/2015 | Aemisegger | B60L 3/0061 |
| | | | 701/42 |
| 10,967,722 B2* | 4/2021 | Tanaka | B60L 50/64 |
| 2021/0408563 A1* | 12/2021 | Lee | B60L 50/71 |
| 2022/0089010 A1* | 3/2022 | Kaiser | B62D 21/02 |
| 2023/0211641 A1* | 7/2023 | Salter | B60D 1/62 |
| | | | 280/455.1 |
| 2023/0311994 A1* | 10/2023 | Zawacki | B62D 21/11 |
| | | | 280/788 |

FOREIGN PATENT DOCUMENTS

| | | | | |
|---|---|---|---|---|
| JP | 2019-103373 A | | 6/2019 | |
| JP | 2020037337 A | * | 3/2020 | .............. B60K 1/04 |
| KR | 20200011712 A | * | 2/2020 | |

* cited by examiner

TRAILER

CROSS-REFERENCE TO RELATED APPLICATION

This application claims priority to Japanese Patent Application No. 2022-135349 filed on Aug. 26, 2022, incorporated herein by reference in its entirety.

BACKGROUND

1. Technical Field

Disclosed herein is a trailer that is a towed vehicle.

2. Description of Related Art

Japanese Unexamined Patent Application Publication No. 2019-103373 (JP 2019-103373 A) discloses a trailer equipped with a battery. In this document, the battery is charged using the rotational power of the wheels of the trailer. For example, if the trailer is a camping trailer, electric power is supplied from the charged battery to electrical equipment installed in the trailer compartment.

Japanese Unexamined Patent Application Publication No. 2012-126250 (JP 2012-126250 A) discloses a detachable auxiliary driving device including a battery unit and an electric motor. When a pre-charged auxiliary driving device is attached to the trailer, the auxiliary driving device drives the wheels of the trailer.

SUMMARY

A so-called hybrid electric vehicle (HEV), a battery electric vehicle (BEV), or the like is equipped with a battery pack serving as a driving power source. The battery pack, for example, includes a plurality of battery cells and a casing that houses the plurality of battery cells.

A battery pack that has deteriorated to the point where it is no longer possible to obtain the high output and high capacity required to drive the vehicle is removed from the vehicle. A reuse method called repurpose is known, in which the removed battery pack is used for purposes other than the power source for driving the vehicle.

As an example of the repurpose, it is conceivable to mount a battery pack removed from a vehicle on a trailer and use it as a power source for the air conditioning of the container on the trailer or as a power source for electrical equipment provided in a kitchen trailer.

However, the shape of the battery pack differs depending on the vehicle type, and there is a risk that so-called customization work, such as removing some components of the battery pack or changing the casing, may be required when mounting the battery pack on the trailer.

Therefore, the trailer disclosed in the present specification is a trailer that can be equipped with various battery packs having different shapes.

A trailer is disclosed in the present specification. This trailer includes a chassis, a battery pack, and a battery frame. The chassis includes a pair of side members and a pair of cross members. The side members are disposed at both ends in a vehicle width direction and extend in a vehicle front-rear direction. The cross members connect front ends and rear ends of the side members and extend in the vehicle width direction. The battery pack includes a plurality of battery cells and a casing housing the battery cells. The battery frame is fixed to the chassis and the battery pack is assembled to the battery frame. The battery frame includes a pair of crossbars and a pair of side bars. The crossbars extend in the vehicle width direction while being spaced apart in the vehicle front-rear direction, and have both ends in the vehicle width direction fixed to the side members. The side bars extend in the vehicle front-rear direction while being spaced apart in the vehicle width direction, and have front ends and rear ends detachably fixed to the crossbars.

According to the above configuration, the side bars are detachable, so that the side bars can move in the vehicle width direction with respect to the crossbars. Therefore, a plurality of types of battery packs having different vehicle width dimensions can be assembled to the battery frame.

Also in the above configuration, the trailer includes a wheel pivotally supported by the chassis. The battery pack is electrically disconnected from a drive mechanism that drives the wheel and a regenerative mechanism that regeneratively brakes the wheel.

According to the above configuration, even if the reusable battery pack does not meet the specifications required for wheel drive and regenerative braking, the battery pack can be mounted on the trailer as a power source for a container mounted on the trailer, for example.

In the above configuration, both ends of the crossbars in the vehicle width direction may be respectively fixed to the side members via side brackets. In this case, each of the side brackets extends downward from a corresponding one of the side members. Further, a corresponding one of the crossbars is fixed to a lower end of each of the side brackets. As a result, the battery frame is positioned at a position lower than a position of the chassis.

According to the above configuration, it is possible to suppress the top surface of the battery placed on the battery frame from protruding from the chassis, and to avoid interference between the floor of the container placed on the chassis and the top surface of the battery.

Further, in the above configuration, the battery frame may be provided rearward of an axle of the wheel.

According to the above configuration, it is possible to avoid interference between the battery pack and vehicle equipment around the wheel, such as a brake mechanism.

According to the trailer disclosed in the present specification, various battery packs with different shapes can be loaded.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Below, a trailer according to an embodiment is explained using the drawings. The shapes, materials, numbers, and numerical values described below are examples for explanation, and can be changed as appropriate according to specifications of the trailer. In the following, like elements are given the same reference signs in all drawings.

In FIGS. 1 to 6, an orthogonal coordinate system consisting of FR, RW, and UP axes is used to represent the position and direction of each component. The FR axis is a vehicle front-rear direction axis with the forward direction of the vehicle as the positive direction. The RW axis is a vehicle width direction axis with the right side of the vehicle as the positive direction. The UP axis is a vehicle up-down direction axis with the upper side as the positive direction.

Figure 1:
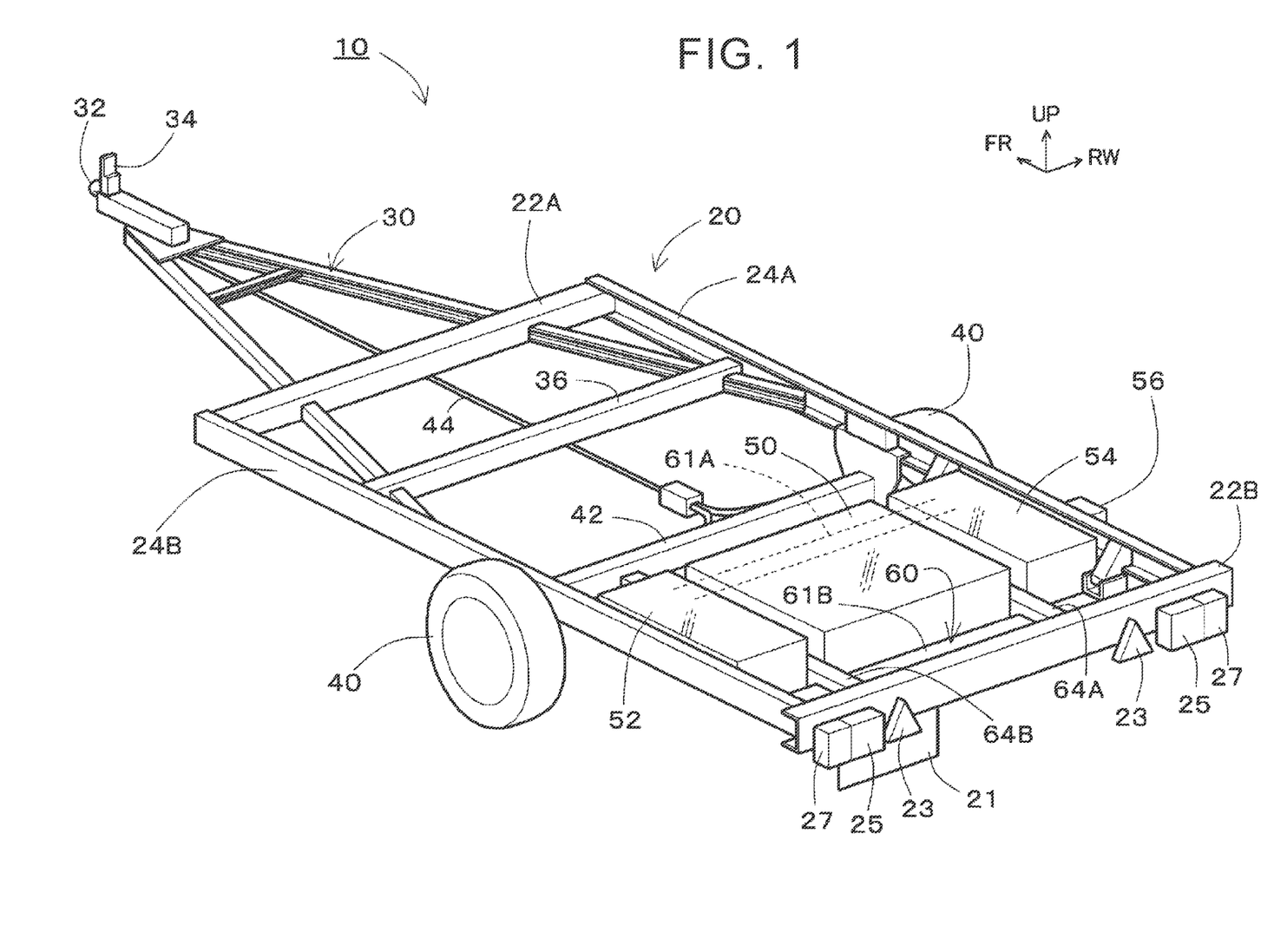
FIG. 1 is a perspective view illustrating a trailer according to an embodiment.
Figure 6:
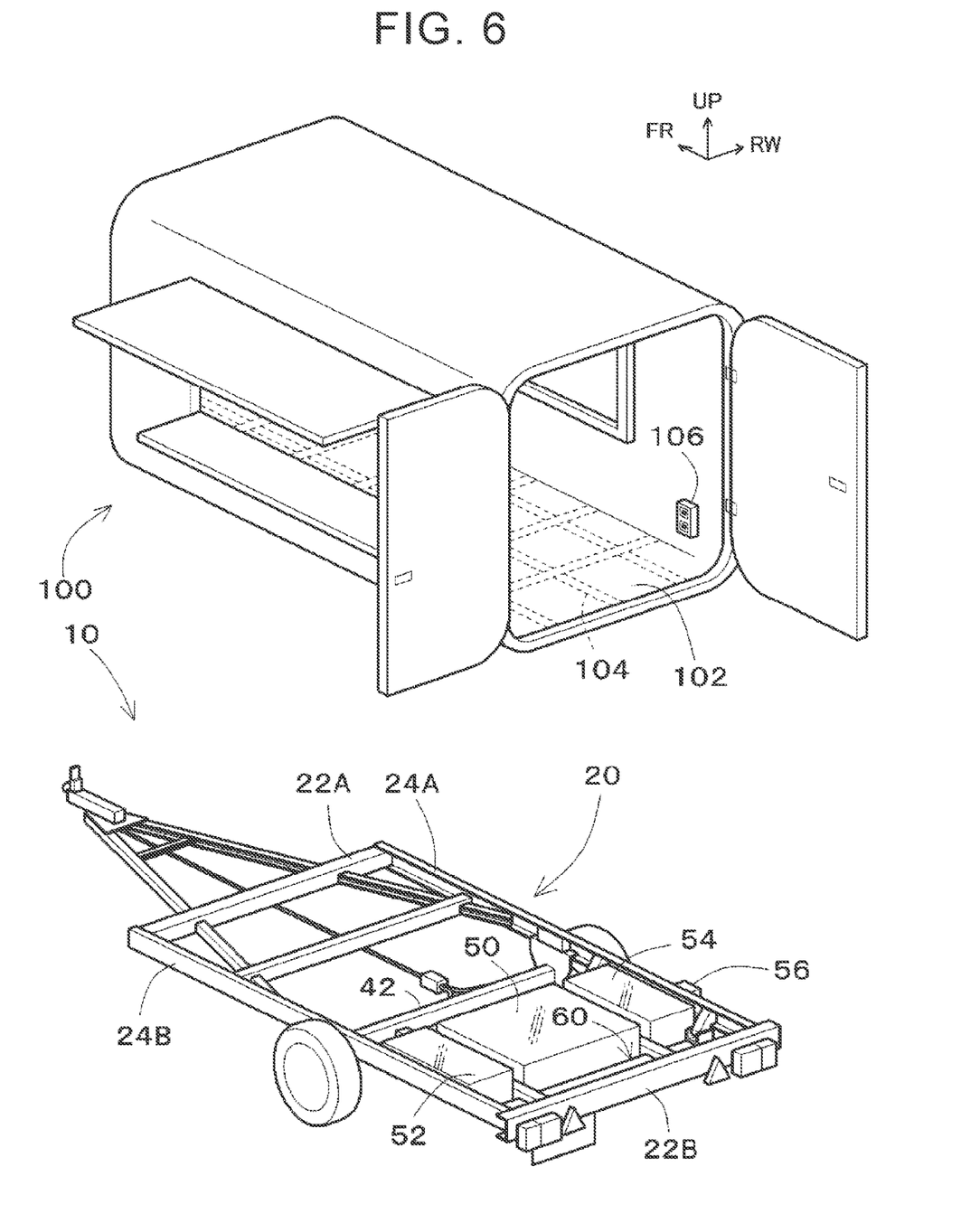
FIG. 6 is an exploded perspective view illustrating the trailer and a container mounted on the trailer.

FIG. 1 illustrates a trailer 10 according to the present embodiment. The trailer 10 is a towed vehicle that is towed by a vehicle (not shown). For example, a chassis of the trailer 10 is loaded with a container 100 as illustrated in FIG. 6. The container 100 is, for example, a freezer container or a kitchen cabin. As will be described later, a battery pack 50 is used as a power source for electrical equipment installed in the container 100.

With reference to FIG. 1, the trailer 10 includes the chassis 20 and a drawbar 30. The chassis 20 is a rectangular frame in plan view, and includes a pair of side members 24A, 24B and a pair of cross members 22A, 22B. The pair of side members 24A, 24B and the pair of cross members 22A, 22B are welded to each other, for example.

The side members 24A, 24B are frame members disposed at both ends of the trailer 10 in the vehicle width direction and extending in the vehicle front-rear direction. For example, the side members 24A, 24B are channel steel, and the groove openings are directed inward in the vehicle width direction.

The cross members 22A, 22B are frame members extending in the vehicle width direction by connecting front ends and rear ends of the pair of side members 24A, 24B. The cross members 22A, 22B may be channel steel, for example. For example, the groove opening of the cross member 22A provided at the front of the vehicle faces downward.

The groove opening of the cross member 22B provided at the rear of the vehicle faces the front of the vehicle. The groove width of the cross member 22B is provided to exceed the groove widths of the side members 24A, 24B, and the rear ends of the side members 24A, 24B are accommodated in the groove of the cross member 22B.

A license plate 21, reflectors 23, brake lamps 25, and turn lamps 27 are attached to the rear surface of the cross member 22B. The brake lamps 25 and turn lamps 27 are connected to an electrical wiring connector (not shown). The electrical wiring connector is connected to the electrical system of the towing vehicle. As a result, the brake lamps 25 and the turn lamps 27 can be turned on in conjunction with the operation of the brake pedal and direction indicator switch of the towing vehicle.

The drawbar 30, which is a connecting rod member, extends from the chassis 20 to the front of the vehicle. For example, the drawbar 30 has an easel-shaped frame member in plan view. The rear ends of the drawbar 30 are fixed to the side members 24A, 24B, and the drawbar 30 extends obliquely forward toward the center of the vehicle in the vehicle width direction from the rear ends. The drawbar 30 is also supported by a support beam 36 and the cross member 22A.

A hitch coupler 32 and a lock lever 34 are provided at the front end of the drawbar 30. The hitch coupler 32 is put on a hitch ball of a hitch member (not shown) provided on the rear surface of the towing vehicle. Further, by tilting the lock lever 34, the hitch coupler 32 is fixed to the hitch ball.

Figure 2:
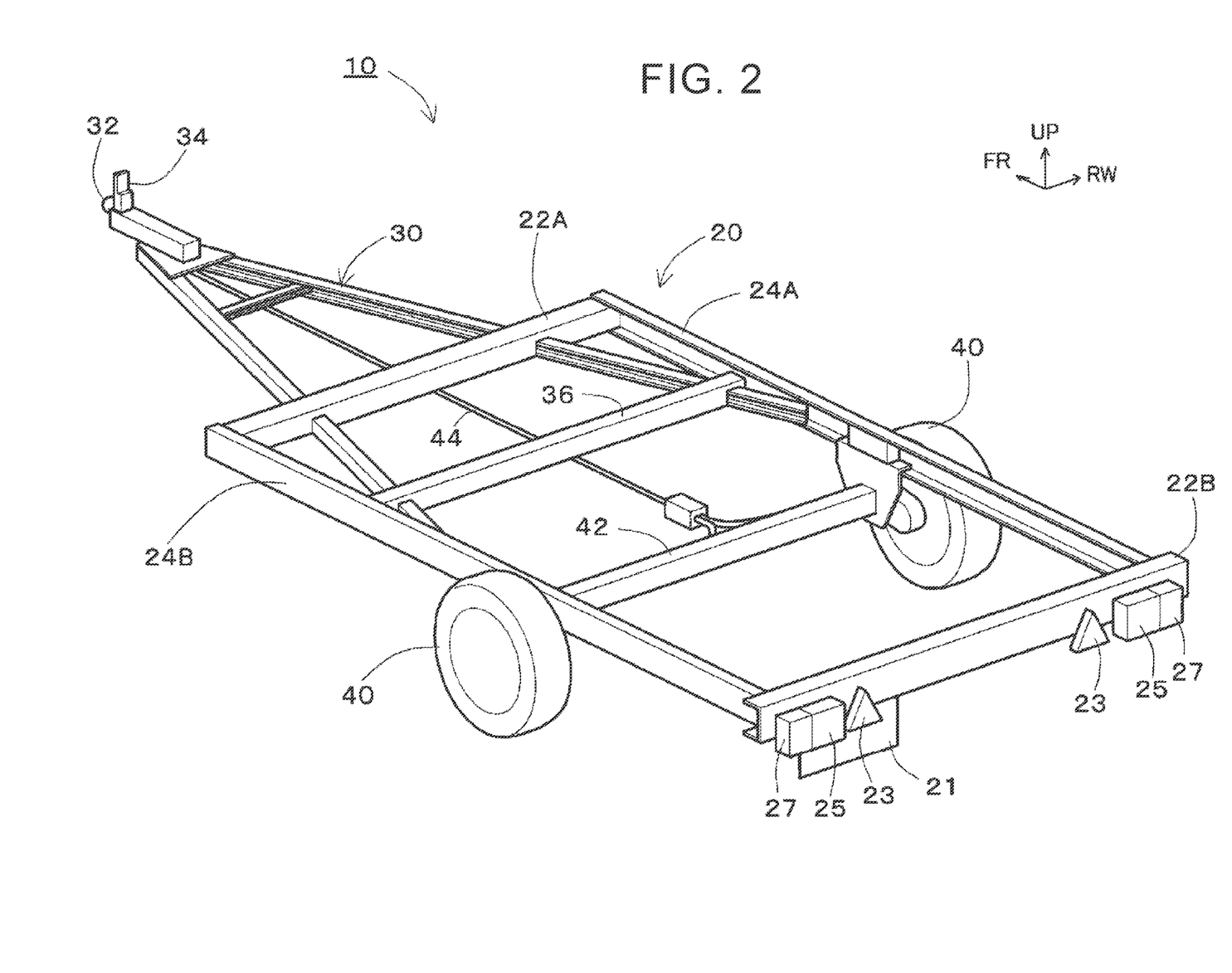
FIG. 2 is a perspective view when a battery pack and a battery frame are removed from FIG. 1.

With reference to FIG. 2, a pair of wheels 40, 40 is pivotally supported by the side members 24A, 24B. For example, the wheels 40 are pivotally supported by the side members 24A, 24B via a suspension mechanism. The example of FIG. 2 shows a torsion suspension having a torsion bar 42 as a suspension mechanism.

As a brake mechanism for the wheels 40, 40, the trailer 10 is provided with an inertia brake mechanism. A wire 44 extends from the wheels 40, 40 toward the front of the vehicle. The front end of wire 44 is attached to the rear surface of the towing vehicle. If the hitch coupler 32 is disengaged from the hitch member of the towing vehicle during towing, the trailer 10 will be left behind the towing vehicle and separated from the towing vehicle. At this time, the wire 44 is pulled by the towing vehicle, thereby activating a brake mechanism (not shown) provided inside the wheels 40, 40 to stop the trailer 10.

Power Source Equipment

With reference to FIGS. 1 and 2, the space from the torsion bar 42, which is the axle of the wheels 40, 40, to the cross member 22B at the rear of the vehicle serves as a mounting area for the battery pack 50. By adopting such a layout, interference between the battery pack 50 and the braking mechanism such as an inertia brake can be avoided.

Figure 3:
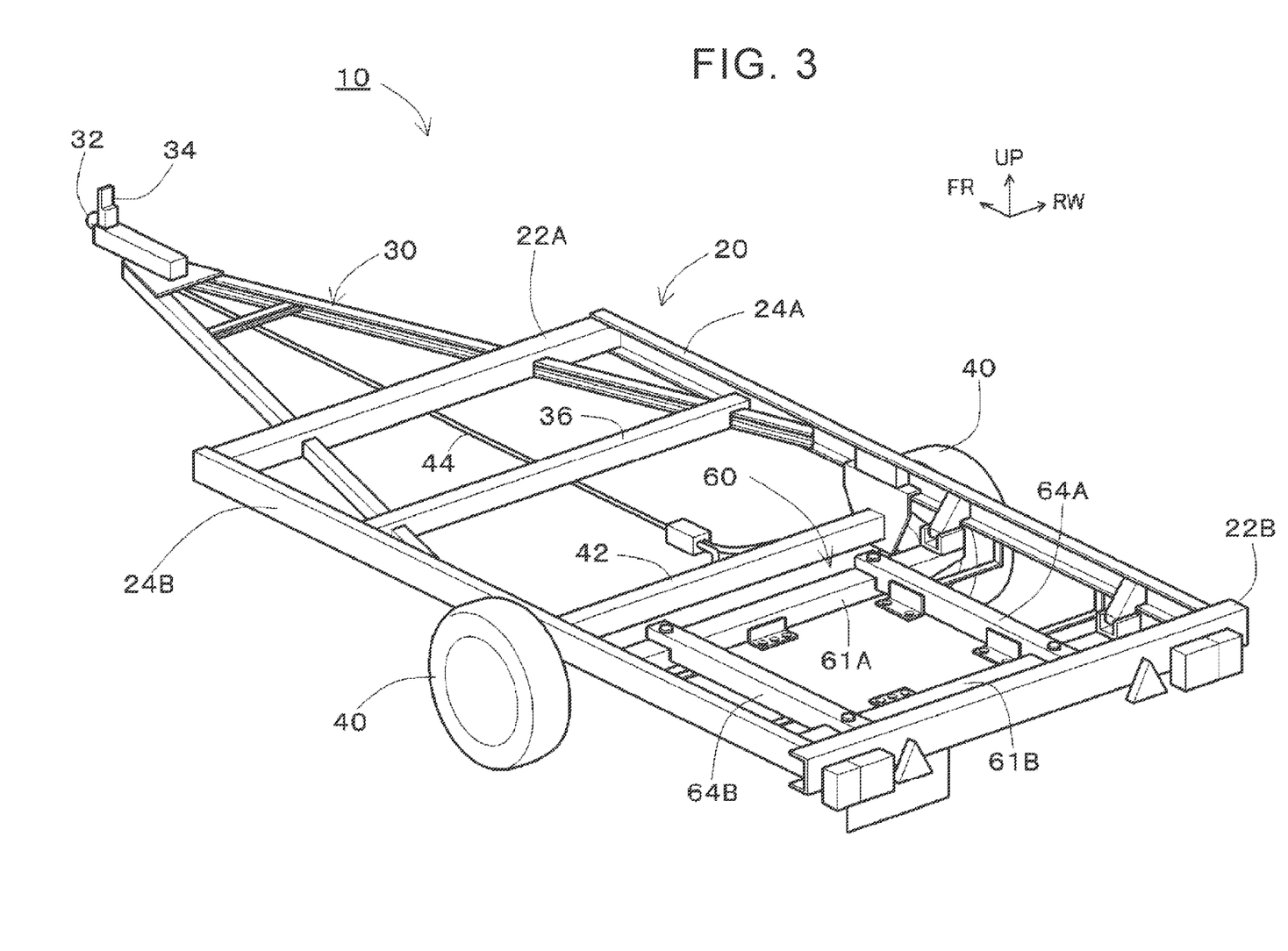
FIG. 3 is a perspective view when the battery frame is attached to the trailer according to the embodiment.

With reference to FIGS. 1 and 3, a battery frame 60 is fixed to the side members 24A, 24B of the chassis 20. The battery pack 50, a power supply unit 52, and a charging unit 54 are assembled to the battery frame 60. For example, the power supply unit 52, the battery pack 50, and the charging unit 54 are arranged on the battery frame 60 in the vehicle width direction.

The charging unit 54 is an electronic device unit that controls charging of the battery pack 50. The charging unit 54 includes, for example, an inverter and a direct-current to direct-current (DC/DC) converter. For example, a charging inlet 56 is provided on the outer surface of the side member 24A in the vehicle width direction. When a charging connector (not shown) of an external charging facility is inserted into the charging inlet 56, alternating current (AC) power is supplied to the charging unit 54 from the charging connector. The inverter of the charging unit 54 converts the supplied power between AC and DC. Also, the DC/DC converter of the charging unit 54 boosts the voltage of the DC power to a voltage suitable for charging the battery pack 50.

The power supply unit 52 controls power supply to the battery pack 50. The power supply unit 52 is electrically connected to the battery pack 50 and a plug socket 106 of the container 100 (see FIG. 6). For example, a power cable (not shown) extends from the power supply unit 52 to the plug socket 106.

The power supply unit 52 includes, for example, an inverter and a DC/DC converter. For example, DC power is supplied from the battery pack 50. The DC/DC converter of the power supply unit 52 steps down the voltage of the DC power to the rated voltage of the electrical equipment (for example, air conditioning equipment, cooking equipment, etc.) connected to the plug socket 106. Furthermore, the DC power is converted into AC power by the inverter, and the AC power after conversion is supplied to the electrical equipment.

For example, the power supply unit 52 and the charging unit 54 accommodate electronic devices such as the inverter and the DC/DC converter in the casing. The power supply unit 52 and the charging unit 54 are fixed to the battery frame 60 so that the top surface of the casing is positioned lower than the top surfaces of the side members 24A, 24B. This fixing mode will be described later.

The battery pack 50 is provided, for example, on the battery frame 60 at the center in the vehicle width direction. For example, the battery pack 50 is a package body in which electrical components such as a battery electronic control unit (ECU), a cooling blower, a current sensor, a voltage sensor, and a temperature sensor are housed in a casing in addition to a plurality of battery cells.

The battery pack 50 is, for example, a so-called reusable product that was installed as a power source for driving a vehicle such as a hybrid electric vehicle (HEV) or a battery electric vehicle (BEV) and removed from the vehicle due to deterioration. For example, the battery pack 50 is mounted on the trailer 10 as it is removed from the original vehicle, without undergoing customization work such as replacement of internal battery cells or modification of the casing.

A power source for driving a vehicle is required to have a high output and a high capacity sufficient to drive a heavy vehicle. When the battery pack 50 is used as a power source for driving a vehicle for a long period of time, the internal battery cells deteriorate. The battery pack 50 of which output and capacity no longer satisfy the required values for driving the vehicle is removed from the vehicle.

After being removed, the battery pack 50 is utilized as a power source device for other purposes based on its output, capacity, and the like. For example, in the trailer 10 according to the present embodiment, the battery pack 50 is used as a power source for electrical equipment used in the container 100 (see FIG. 6).

For example, the container 100 is a kitchen cabin for providing cooking and selling services. That is, the trailer 10 is used as a kitchen trailer. In such a case, the container 100 is equipped with a refrigerator, a water supply pump, and lighting as electrical equipment for the store.

The battery pack 50 is exclusively used as a power source for these electrical equipment for the store. In other words, the battery pack 50 is not used as a power source for driving a vehicle, which has been the previous purpose of use. For example, the battery pack 50 is electrically disconnected from the drive mechanism that drives the wheels 40 of the trailer 10 and the regenerative mechanism that regeneratively brakes the wheels 40.

For example, the trailer 10 is not equipped with a rotating electrical machine for driving and regeneratively braking the wheels 40. In such a configuration, charging devices for the battery pack 50 is exclusively external charging through the charging inlet 56 and other charging devices are excluded from the trailer 10. Further, the power supply destination of the battery pack 50 is exclusively the plug socket 106 in the container 100 and the electrical equipment in the container 100, and the other in-vehicle electrical equipment (for example, the brake lamps 25 and the turn lamps 27) is excluded from the power supply destination of the battery pack 50.

As described above, in the trailer 10 according to the present embodiment, the battery pack 50 is exclusively used as a power source for electrical equipment inside the container 100. For example, the battery pack 50 is permitted to be mounted on the trailer 10 if the battery pack 50 has the same quality as a stationary power source, which is a household power source. This allows battery packs 50 with various degrees of deterioration to be mounted on the trailer 10.

Further, for example, if a mobile battery or the like is separately loaded in the container 100 as the power supply for the store of the container 100, the usable space of the container 100 is reduced accordingly. In view of this, in the trailer 10 according to the present embodiment, the battery pack 50, which is the power source for the store, is accommodated inside the chassis 20 of the trailer 10, in other words, under the floor of the container 100. Therefore, it is possible to avoid occupying part of the usable space of the container 100 with the power source.

Battery Frame

Figure 4:
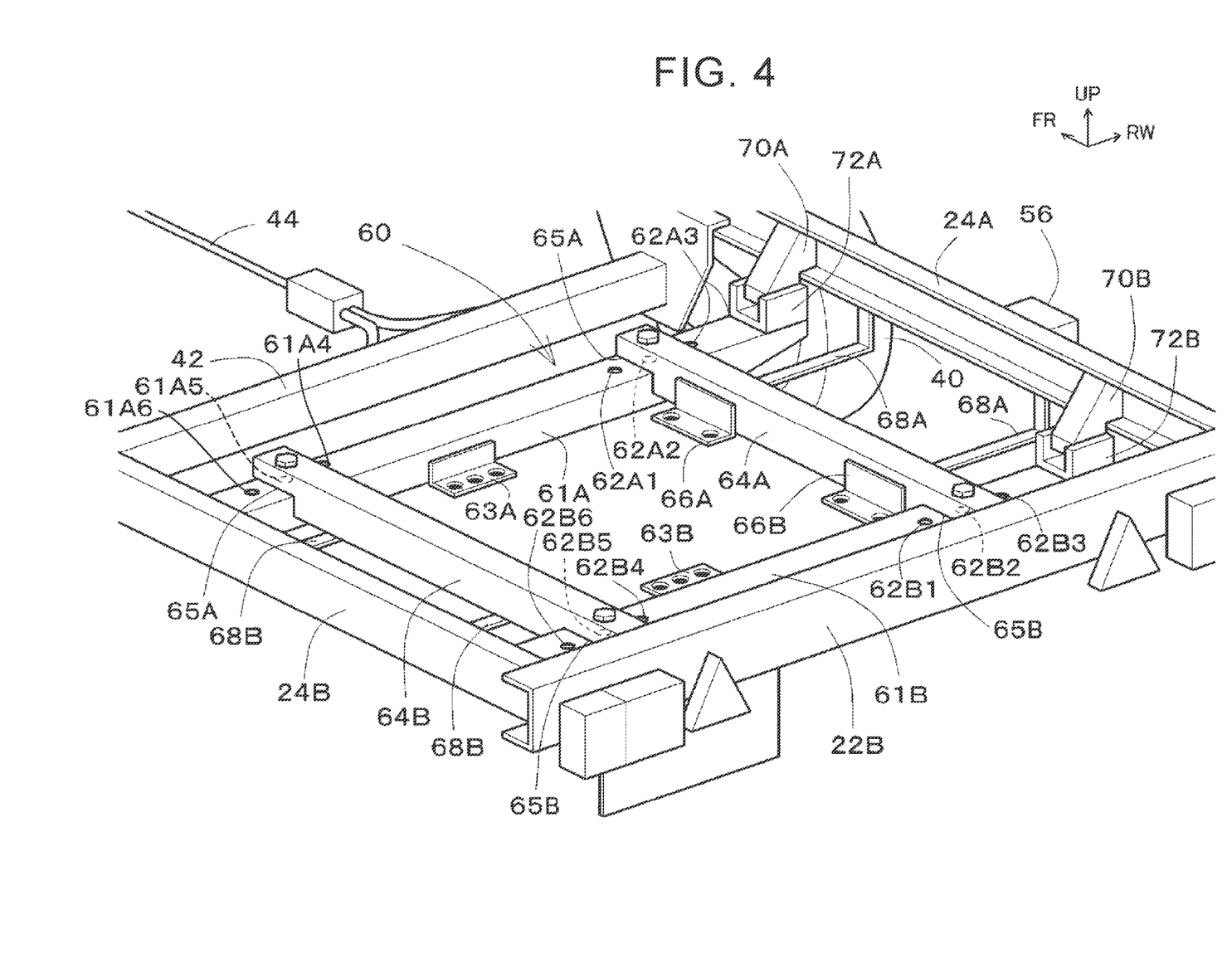
FIG. 4 is an enlarged perspective view of the periphery of the battery frame.

The battery frame 60 is a grid-shaped mounting frame that is fixed to the chassis 20 of the trailer 10. The battery pack 50 is assembled to the battery frame 60. With reference to FIGS. 3 and 4, the battery frame 60 includes a pair of crossbars 61A, 61B and a pair of side bars 64A, 64B.

The crossbars 61A, 61B are frame members extending in the vehicle width direction while being spaced apart in the vehicle front-rear direction, and both ends in the vehicle width direction are fixed to the side members 24A, 24B. The crossbars 61A, 61B are made of, for example, square steel pipes (square pipes).

Figure 5:
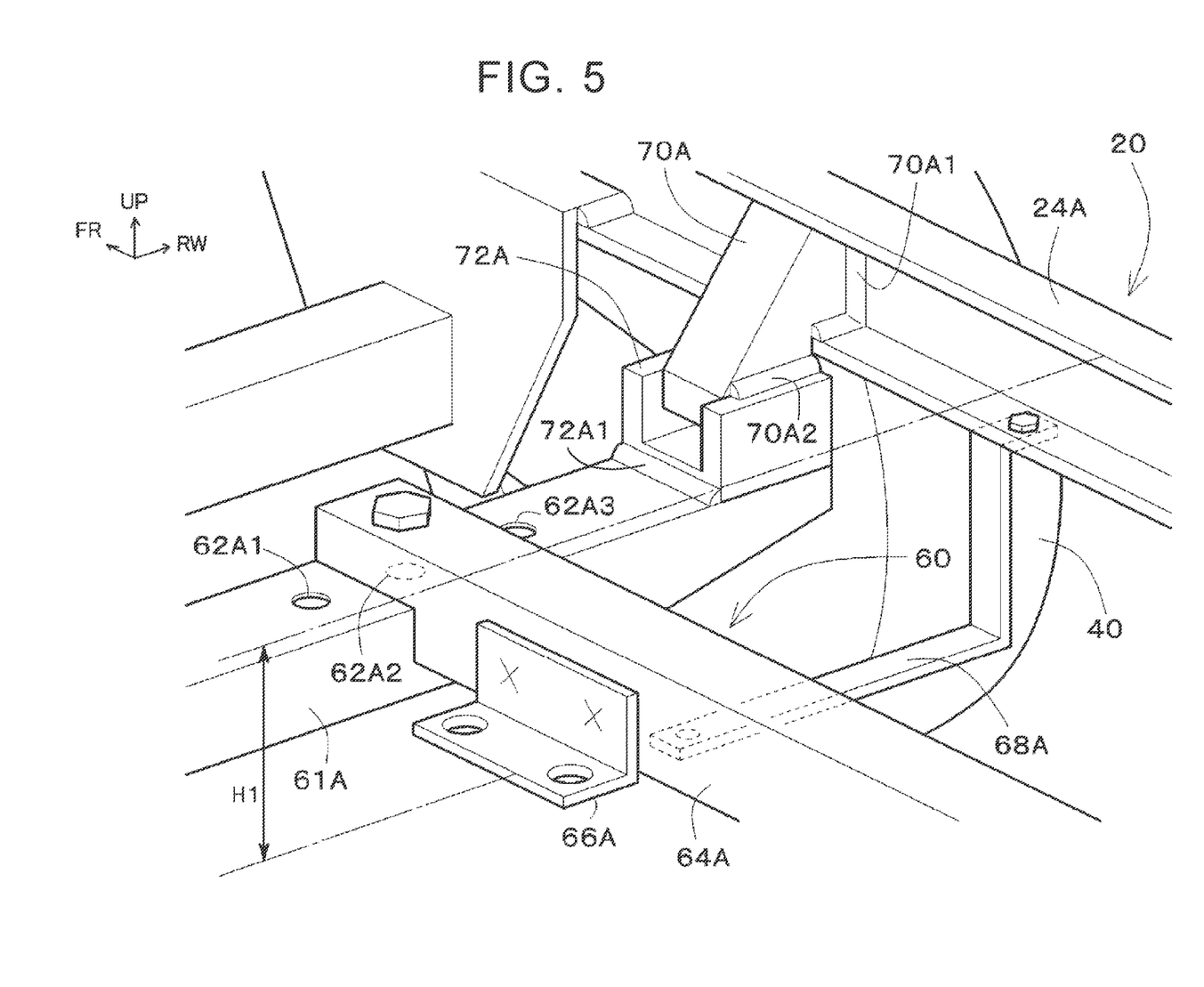
FIG. 5 is a further enlarged perspective view of FIG. 4.

With reference to FIG. 4, both ends of the pair of crossbars 61A, 61B in the vehicle width direction are fixed to the side members 24A, 24B via side brackets 70A, 70B and lower brackets 72A, 72B. FIGS. 3 to 5 do not show the left side brackets 70A, 70B and the left lower brackets 72A, 72B. However, based on the symmetry of the vehicle structure, the side brackets 70A, 70B and the lower brackets 72A, 72B having structures symmetrical to those illustrated in FIGS. 3 to 5 are provided on the left ends of the pair of crossbars 61A, 61B.

FIG. 5 illustrates an enlarged perspective view of the side bracket 70A and the lower bracket 72A. The side bracket 70B and the lower bracket 72B also have the same structure as shown in FIG. 5. The side bracket 70A has its outer end in the vehicle width direction inserted into the groove of the side member 24A. The side bracket 70A is welded to the side member 24A, for example, as indicated by a bead 70A1.

An inner portion of the side bracket 70A in the vehicle width direction extends downward from the side member 24A. A lower end of the side bracket 70A is fixed to the crossbar 61A via the lower bracket 72A. The lower bracket 72A is, for example, a channel steel, and the groove extends in the vehicle width direction.

The lower end of the side bracket 70A enters into the groove of the lower bracket 72A. The side bracket 70A and the lower bracket 72A are fixed by welding as indicated by a bead 70A2.

The lower end (groove bottom) of the lower bracket 72A is connected to the end of the crossbar 61A in the vehicle width direction. The lower bracket 72A is welded to the crossbar 61A, as indicated by a bead 72A1.

Since the side member 24A, the side bracket 70A, the lower bracket 72A, and the crossbar 61A are fixed by welding, the crossbar 61A is fixed to the side member 24A (and the side member 24B) in a non-detachable state. As for the crossbar 61B, these members are similarly fixed to the side members 24A, 24B in a non-detachable state. That is, the separation distance between the crossbars 61A, 61B in the vehicle front-rear direction, in other words, the vehicle front-rear width of the battery frame 60 is maintained at a constant width.

For example, when various battery packs 50 having different shapes to be assembled to the battery frame 60 have the same vehicle front-rear dimension, the separation distance between the crossbars 61A, 61B is fixed so that the mounting work of the battery pack 50 can be performed smoothly.

For example, when the battery pack 50 is used as a power source for driving a vehicle, the battery pack 50 is installed under the rear seat of the vehicle. Since the width of the rear seat of the vehicle is almost constant among vehicle types, various battery packs 50 with different shapes can be mounted on the battery frame 60 by setting the separation distance between the crossbars 61A, 61B to this width of the rear seat.

Also, with reference to FIG. 4, the crossbars 61A, 61B are fixed to the side members 24A, 24B via the side brackets 70A, 70B and the lower brackets 72A, 72B, so that the battery frame 60 is positioned lower than the chassis 20. As shown by an accommodation depth H1 in FIG. 5, which will be described later, the battery frame 60 is disposed at a position (sinking position) lower than the chassis 20, so that the battery pack 50 can be suppressed from protruding from the chassis 20.

With reference to FIGS. 4 and 5, the side bars 64A, 64B extend in the vehicle front-rear direction while being separated in the vehicle width direction. Further, the front ends and rear ends of the side bars 64A, 64B are fixed to the pair of crossbars 61A, 61B. The side bars 64A, 64B are made of square steel pipes (square pipes), for example.

Cutouts 65A, 65B are provided at the front and rear ends of the side bars 64A, 64B, respectively. The cutouts 65A, 65B are used for alignment when the front and rear ends of the side bars 64A, 64B are placed on the crossbars 61A, 61B.

The side bars 64A, 64B are detachably fixed to the crossbars 61A, 61B. The side bars 64A, 64B are fastened and fixed to the crossbars 61A, 61B using, for example, bolts and nuts.

With reference to FIGS. 4 and 5, a plurality of fastening holes 62A1 to 62A6 is drilled in the top surface of the crossbar 61A along the vehicle width direction. A plurality of fastening holes 62B1 to 62B6 is also drilled in the top surface of the crossbar 61B along the vehicle width direction. For example, three fastening holes are provided in each of the front and rear ends of the side bars 64A, 64B.

The fastening holes 62A1 to 62A6, 62B1 to 62B6 to which the side bars 64A, 64B are fastened are defined according to the vehicle width direction dimensions of the battery pack 50 that is a mounted object. For example, the front ends and rear ends of the side bars 64A, 64B are slid on the crossbars 61A, 61B, and then fastened with bolts and nuts to the crossbars 61A, 61B. Since the separation distance between the side bars 64A, 64B in the vehicle width direction can be set flexibly in this way, various battery packs 50 with different shapes can be mounted on the battery frame 60.

With reference to FIGS. 1, 4 and 5, supporting members for supporting the battery pack 50, the power supply unit 52, and the charging unit 54 are attached to the side members 24A, 24B, the crossbars 61A, 61B, and the side bars 64A, 64B.

For example, a pair of support bands 68A, 68A extends across the side member 24A and the side bar 64A. Similarly, a pair of support bands 68B, 68B extends across the side member 24B and the side bar 64B. For example, as illustrated in FIG. 5, the support bands 68A, 68B are attached to the bottom walls of the side members 24A, 24B and the side bars 64A, 64B. The power supply unit 52 and the charging unit 54 are supported by the support bands 68A, 68B from their bottom surfaces.

With reference to FIGS. 4 and 5, L-shaped brackets 63A, 63B, 66A, 66B are attached to the crossbars 61A, 61B and the side bar 64A. For example, with reference to FIG. 5, vertical plates of L-shaped brackets 63A, 63B, 66A, 66B are fixed by welding to side walls of the crossbars 61A, 61B and the side bar 64A. A plurality of fastening holes is drilled in the horizontal plate.

The L-shaped brackets 63A, 63B, 66A, and 66B abut on the bottom wall of the battery pack 50 to support the battery pack 50. Further, a fastening holes (not shown) provided in the bottom wall of the battery pack 50 and the fastening holes of the respective L-shaped brackets 63A, 63B, 66A, 66B are axially aligned to be fastened and fixed.

With reference to FIG. 5, the height H1 from the lateral plate of the L-shaped bracket 66A to the top surface of the side member 24A can be regarded as the accommodation depth of the battery pack 50.

When the types of the battery packs 50 that may be mounted on the trailer are known, the maximum height (pack thickness) of the battery packs 50 of various shapes is the standard. For example, with reference to FIG. 5, the UP axial dimensions of the side bracket 70A and the lower bracket 72A are defined such that the accommodation depth H1 has a value larger than the maximum height (maximum thickness) H0 of the various battery packs 50 (H0<H1).

In the example of FIG. 5, the side brackets 70A (, 70B) and the lower brackets 72A (, 72B) are fixed by welding. However, the side brackets 70A (, 70B) and the lower brackets 72A (, 72B) may be fixed using detachable fixing such as fastening fixing. In this case, the height position of the lower brackets 72A (, 72B) relative to the side brackets 70A (, 70B) can be adjusted by drilling a plurality of fastening holes in the height direction.

In this manner, by making the accommodation depth H1 greater than the height H0 of the battery pack 50, the battery pack 50 is suppressed from protruding from the chassis 20. With reference to FIG. 6, the container 100 placed on the chassis 20 is provided with a grid-shaped floor frame 104 as a reinforcing member for a floor 102.

To facilitate user movement within the container 100, the floor 102 and floor frame 104 may be laid flat. In such a case, since the protrusion of the battery pack 50 from the chassis 20 is suppressed on the trailer 10 side, interference between the battery pack 50 and the floor frame 104 can be avoided. That is, the work of assembling the container 100 to the trailer 10 can be performed smoothly.

What is claimed is:

1. A trailer comprising:
   a chassis including a pair of side members that is disposed at both ends in a vehicle width direction and that extends in a vehicle front-rear direction, and a pair of cross members that connects front ends and rear ends of the side members and that extends in the vehicle width direction;
   a wheel pivotally supported by the chassis;
   an axle of the wheel;
   a battery pack including a plurality of battery cells and a casing housing the battery cells; and
   a battery frame fixed to the chassis and to which the battery pack is assembled, wherein the battery frame includes
   a pair of crossbars extending in the vehicle width direction while being spaced apart in the vehicle front-rear direction, and having both ends in the vehicle width direction fixed to the side members, and
   a pair of side bars extending in the vehicle front-rear direction while being spaced apart in the vehicle width direction, and having front ends and rear ends detachably fixed to the crossbars, wherein the pair of crossbars are provided rearward of the axle of the wheel such that the pair of crossbars are spaced apart from the axle of the wheel in the vehicle front-rear direction, and wherein the battery pack is electrically disconnected from a drive mechanism that drives the wheel and a regenerative mechanism that regeneratively brakes the wheel.

2. The trailer according to claim 1, wherein both ends of the crossbars in the vehicle width direction are respectively fixed to the side members via side brackets, each of the side brackets extends downward from a corresponding one of the side members, and a corresponding one of the crossbars is fixed to a lower end of each of the side brackets, and the battery frame is positioned at a position lower than a position of the chassis.

\* \* \* \* \*